March 14, 1961 — A. R. NEWTON — 2,974,503
TORQUE LIMITING DEVICE
Filed Feb. 21, 1958

Inventor
Alan R. Newton
by Roberts, Cushman & Grover
Attys ed States Patent Office 2,974,503
Patented Mar. 14, 1961

2,974,503

TORQUE LIMITING DEVICE

Alan R. Newton, 23 Baylies St., New Bedford, Mass.

Filed Feb. 21, 1958, Ser. No. 716,760

4 Claims. (Cl. 64—30)

This invention relates to torque limiting devices and has for its principal object to provide a device for use in connecting a rotary tool to the drive spindle of a portable electric motor, it being understood however that it can also be used for connecting a tool to the drive spindle of a drill press or the like. Other objects are to provide a torque limiting device which can be easily mounted in the conventional chuck carried by such motor driven spindles and to which the tool may be easily connected, to provide a torque limiting device which may be adjusted to increase or decrease the torque it will transmit, to provide a device in which the torque at any given setting will remain constant and to provide a device which is comprised of relatively few parts, is durable and inexpensive to manufacture.

As herein illustrated, the device comprises a pair of relatively movable elements having surface contact, coupling means yieldably holding the surfaces of the elements in frictional contact and anti-friction means situated between the coupling and one of the elements to prevent turning of the one element relative to the other from changing the adjustment of the adjustable coupling means. One of the elements has a stem fast to it adapted to be clamped in a chuck by which the element is caused to turn and to transmit rotational movement to the other until the amount of torque reaches the limit set by adjustment of the coupling means, and the other carries means by which a tool may be attached thereto.

The invention will now be described in greater detail with reference to the accompanying drawings wherein.

Figure 1:
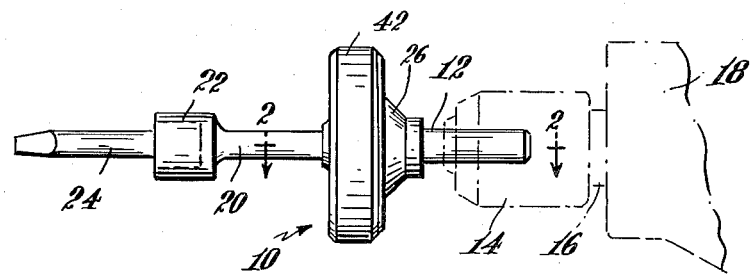
Fig. 1 is an elevation of the torque limiting device shown mounted in a chuck at the end of the shaft of an electric motor, the chuck and a portion of the motor being shown in dot and dash lines and with a tool connected thereto.

Referring to the figures, the torque limiting device 10 has a stem 12 of suitable length and diameter, to be firmly gripped at one end within a chuck 14, such as is conventionally mounted on a shaft 16 extending from a portable electric motor 18. Such portable electric motors are usually enclosed within a housing with a handle so that the motor can be manipulated with ease, and are provided with a trigger for turning the motor on and off when desired.

Figures 2, 3:
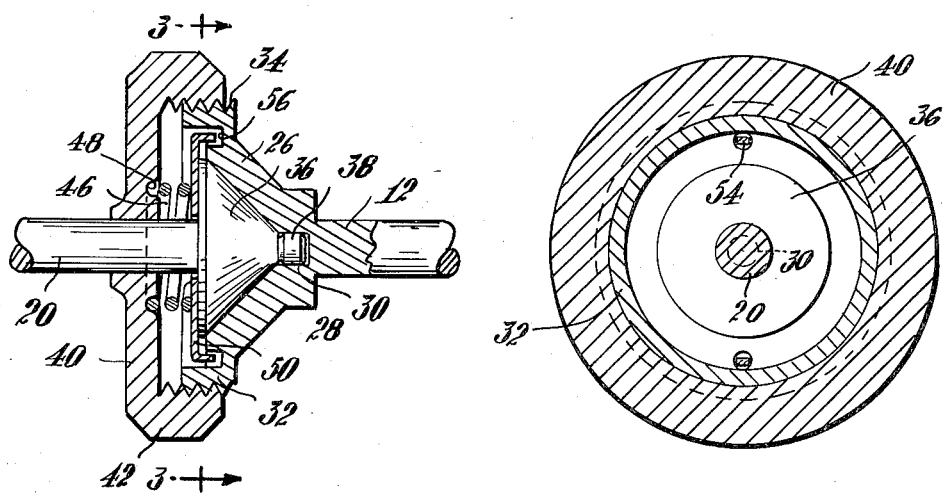
Fig. 2 is a diametrical section taken on the line 2—2 of Fig. 1.
Fig. 3 is a section taken on the line 3—3 of Fig. 2.
Figure 4:
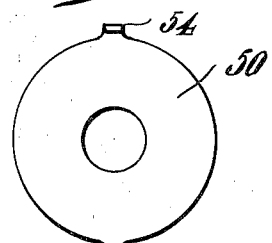
Fig. 4 is an elevation of an anti-friction disc.
Figure 5:
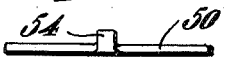
Fig. 5 is an edge view of the anti-friction disc.

The opposite end of the stem 12 has integral therewith a member 26 (Fig. 2), containing a conical opening 28, the axis of which coincides with the axis of the stem. At the inner end of the conical opening there is a small diameter cylindrical opening 30. At the outer end of the opening the member has a circular rim 32 which is externally threaded at 34.

A cone 36 fits into the conical opening of the member 26 and its conical surface is yieldingly held in contact with the internal conical surface of the member 26 by an adjustable coupling element 40 and a compression spring 46. The coupling element 40 is threaded for engagement with the threads 34 on the member 26 and operates to hold the spring 46 under compression, between it and the outer side or base of the cone. A circular groove 48 in the coupling member receives the end of the spring and prevents it from being displaced. At the opposite end the spring bears against an anti-friction plate 50 disposed against the base of the cone. The plate is provided with diametrically located lugs 54 engaged within openings or depressions 56 in the rim 32 of the member 26 to prevent its rotation. To prevent lateral wearing and to preserve concentricity of the cone 36 and the member 26, a thrust bearing 38 is formed at the apex of the cone for engagement within the cylindrical opening 30.

The coupling element 40 has a hole through its center concentric with the axis of the stem 12 and a stem 20 extends from the center of its base through the spring 46 and the hole in the coupling 40, the latter being large enough so that the stem 20 will turn freely in the opening. The stem 20, as shown, is integral with the cone at its inner end and carries at its outer end a socket 22 within which the shank of a tool 24 may non-rotatably be mounted relative to the stem 20.

Figure 6:
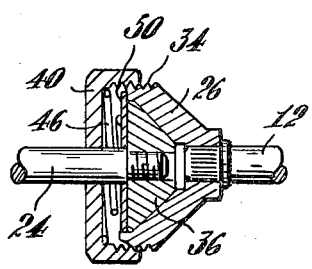
Fig. 6 is a diametrical section through a modification of the device.
Figure 7:
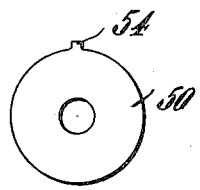
Fig. 7 is a plan view of the anti-friction device for use with the modified form.

Alternatively, the stem 12 may be made independently of the part 26 and press-fitted thereinto, as shown in Fig. 6. In like manner, the stem 20 may be made independently of the cone 36 and threaded into its base. The spring 40 in this form is a conical helix with its base in contact with the coupling member 40 and its apex in contact with the anti-friction disc 50, and as thus constructed, is held against displacement without requiring the cutting of the groove 48 in the coupling member. A single lug 54 on the anti-friction disc, extending radially therefrom for engagement with a radial notch or slot in the rim of the member 26, is sufficient to prevent rotation thereof and eliminates the necessity for drilling holes in the rim.

The anti-friction ring or disc 50 may be made of brass or bronze, however, other anti-friction bearing materials may be employed such as nylon and the like plastics which have a high degree of wear-resistance and a very low index of friction. If desired, the disc may be made of pressed and sintered powdered metal according to well-known methods to provide a porous structure which may be impregnated with oil or lubricant.

In either form of the invention the coupling member 40 may be turned relative to the member 26 to compress the spring 46 and hence to force the surface of the cone 36 against the surface of the conical opening in the member 26 to increase the friction between the surfaces and hence to increase the amount of torque the device will transmit. By turning the coupling element 40 in the opposite direction the amount of torque that may be transmitted may be lessened. Accordingly, the device by adjustment may be set so that it will drive a screw into a surface until a certain resistance is met, whereupon it will slip so that no amount of force will drive the screw further into the work. Thus, it is possible by setting the device to transmit a given torque to prevent the user from inadvertently driving the screw too far into the surface or breaking a tool.

An important advantage of the device lies in the provision of the anti-friction disc 50 at the base of the cone, which allows the end of the spring 46 in contact therewith, to slip freely so that there is no possibility of the coupling member 40 being turned in one direction or the other, so as to increase the amount of torque that may be transmitted or to unscrew the parts so that they become disconnected. In other words, the presence of the anti-friction disc prevents rotation of the coupling element 40 from being transmitted through the spring 46, to the base of the cone 36 or vice versa, resistance of the stem 20 to turning being transmitted from the cone 36 through the spring 46, to the coupling element 40 so as to unscrew it.

It should be understood that the present disclosure is for the purpose of illustration only and that this invention includes all modifications and equivalents which fall within the scope of the appended claims.

I claim:

1. A torque limiting device comprising a pair of relatively movable elements having opposed inner complementary surfaces, a major portion of the areas of said surfaces being in frictional contact, a coupling adjustably threaded on an exterior portion of one element with a part opposite the outer side of the other element, a compression spring situated between the part of the coupling opposite the outer side of said other element and said other element, said coupling being adjustable on one element relative to the other to change the compression of the spring, an anti-friction bearing plate disposed between the end of the spring and said other element, said anti-friction plate and said one element having interengaged means which causes the anti-friction plate to turn with said one element relative to the other element, means for drivably connecting the one element to a driven element, and means carried by said other element to which a tool may be connected.

2. A torque limiting device according to claim 1, wherein said means for drivably connecting the one element to a driven member and said means carried by said other element to which a tool may be connected comprise opposed, axially aligned spindles.

3. A torque limiting device according to claim 2, wherein one of said spindles is pressed into said one element and the other spindle is removably threaded into said other element.

4. A torque limiting device according to claim 2, wherein one of said complementary frictionally contacting surfaces has firmly affixed thereto a cylindrical thrust bearing and the other of said surfaces has a recess, the walls of which substantially engage said bearing, said recess and bearing being axially aligned with said spindles.

References Cited in the file of this patent

UNITED STATES PATENTS

| 804,778 | Smith | Nov. 14, 1905 |
| 1,021,247 | Goersch | Mar. 26, 1912 |
| 1,198,421 | Conklin | Sept. 19, 1916 |
| 1,217,746 | Graf | Feb. 27, 1917 |
| 2,569,144 | Benson | Sept. 25, 1951 |